(12) United States Patent
Franko et al.

(10) Patent No.: US 8,711,153 B2
(45) Date of Patent: Apr. 29, 2014

(54) METHODS AND APPARATUSES FOR CONFIGURING AND OPERATING GRAPHICS PROCESSING UNITS

(75) Inventors: Itay Franko, Hillsboro, OR (US); Anshuman Thakur, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1138 days.

(21) Appl. No.: 12/006,015

(22) Filed: Dec. 28, 2007

(65) Prior Publication Data

US 2009/0167771 A1 Jul. 2, 2009

(51) Int. Cl.
*G06F 15/16* (2006.01)

(52) U.S. Cl.
USPC .......................................... 345/502; 345/501

(58) Field of Classification Search
USPC .......................................... 345/506; 713/320
See application file for complete search history.

(56) References Cited

U.S. PATENT DOCUMENTS

| | | | |
|---|---|---|---|
| 6,490,277 B1 * | 12/2002 | Tzotzkov | 370/360 |
| 6,789,154 B1 * | 9/2004 | Lee et al. | 710/315 |
| 6,956,579 B1 * | 10/2005 | Diard et al. | 345/537 |
| 7,075,541 B2 * | 7/2006 | Diard | 345/505 |
| 7,483,031 B2 * | 1/2009 | Williams et al. | 345/502 |
| 7,616,206 B1 * | 11/2009 | Danilak | 345/505 |
| 7,616,207 B1 * | 11/2009 | Diard et al. | 345/506 |
| 7,849,336 B1 * | 12/2010 | Loiler et al. | 713/300 |
| 2006/0276929 A1 * | 12/2006 | Sudolcan et al. | 700/213 |
| 2007/0197291 A1 * | 8/2007 | Shimizu et al. | 463/36 |
| 2007/0257935 A1 * | 11/2007 | Koduri et al. | 345/611 |
| 2008/0168285 A1 * | 7/2008 | de Cesare et al. | 713/320 |
| 2008/0195843 A1 * | 8/2008 | Muniandy | 712/31 |
| 2009/0096797 A1 * | 4/2009 | Du et al. | 345/506 |

* cited by examiner

*Primary Examiner* — Phi Hoang
(74) *Attorney, Agent, or Firm* — Schubert Law Group PLLC

(57) ABSTRACT

A graphics processing system with multiple graphics processing cores (GPC)s is disclosed. The apparatus can include a peripheral component interface express (PCIe) switch to interface the GPCs to a host processor. The apparatus can also include a transparent bus to connect the GPCs. The transparent bus can be implemented with two PCIe endpoints on each side of a nontransparent bridge where these three components provide a bus interconnect and a control line interconnect between the GPCs. Other embodiments are also disclosed.

19 Claims, 2 Drawing Sheets

METHODS AND APPARATUSES FOR CONFIGURING AND OPERATING GRAPHICS PROCESSING UNITS

FIELD

Some embodiments disclosed herein relate to the field of video processing and more particularly, to the field of configuring and operating graphics processing units.

BACKGROUND

The term graphics processing unit, (GPU) is often utilized to describe circuit cards that can be added to a host computer to upgrade the quality of the graphics displayed to the user. Such expandable systems are becoming more popular due to emergence of visually superior games, medical imaging advancements and also for general purpose computing. These compelling applications have created a need for computing systems with graphics upgrade capabilities or graphics expansion capability. Thus, newer systems provide connections that allow for additional GPU cards to be "plugged in" when increased graphics processing capabilities are desired.

Many GPU's utilize a Peripheral Component Interconnect express (PCIe) compatible components to interconnect the GPU engines or GPU cores. A PCIe bus is an input output (I/O) interconnect bus standard which includes both a protocol and a layered communication architecture that expands on and doubles the data transfer rates of the original Peripheral Component Interconnect (PCI) architecture. PCIe is a two-way, serial connection that carries data in packets along two pairs of point-to-point data lanes, compared to the single parallel data bus of traditional PCI that routes data at a set rate.

Initial bit rates for PCIe busses can reach 2.5 Gb/s per lane direction, which equate to data transfer rates of approximately 500 MB/s. The PCIe specification was developed so that high-speed interconnects such as the Institute of Electrical and Electronic Engineers (IEEE) standard 1394b, uniform serial bus 2.0, "InfiniBand" and "Gigabit Ethernet" can have an I/O architecture suitable for their transfer high speeds. The PCIe format is compatible with legacy PCI systems. PCIe based communications utilize a physical layer that includes a network of serial interconnects. A hub on a main board can act as a crossover switch that allows point-to-point device interconnections to be rerouted "on the fly" to adapt to changing conditions. PCIe is a layered protocol, consisting of a Transaction Layer, a Data Link Layer, and a Physical Layer. The Physical Layer is further divided into a logical sublayer and an electrical sublayer. The logical sublayer is frequently further divided into a Physical Coding Sublayer (PCS) and a Media Access Control (MAC) sublayer.

Multiple GPUs can work collectively as one entity and can share a graphics processing work load even though they may or may not be recognized as separate resources by the host system. PCIe switches can be utilized to interconnect the outputs of GPUs. Thus, a graphics processing task can be segmented into multiple segments and one GPU can process each segment. In this distributed processing architecture/operation it is important to detect, connect and coordinate the multiple GPU's. This coordination can be achieved by a communication bus that connects the GPU's. Such a bus is typically not directly connected to the main or host processor and the host processor typically does not get involved in the graphics rendering process (es) conducted by and between the GPU's.

In fact many different kinds of GPU's exist and are available on the market and communication between such GPUs can pose problems. One such GPU is a Nvidia G80 manufactured by the Nvidia Corporation. The Nvidia G80 utilizes a communication bus referred to as a scalable link interface (SLI). The SLI can link multiple GPUs in a computer system such that the multiple GPU's can share the processing work load. Because a host computer cannot track interactions between the GPU's phenomena can occur where the GPU's will cease functioning properly and the host processor cannot recognize such a phenomena. Current graphics processing systems are less than perfect.

DETAILED DESCRIPTION OF EMBODIMENTS

Figure 1:
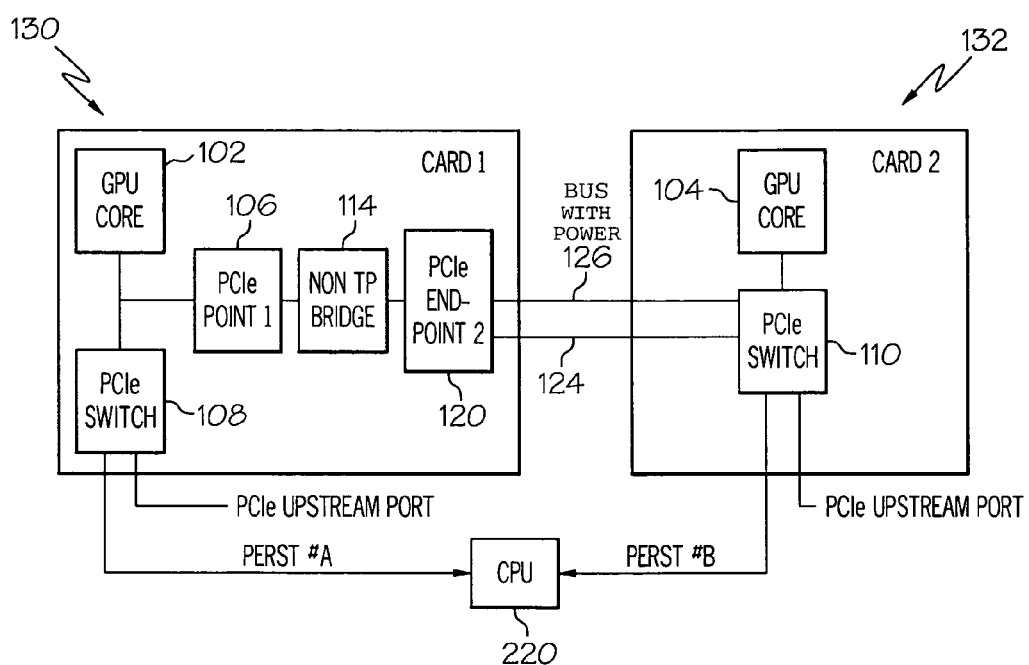
FIG. 1 depicts a multi-graphical processing core system.

The following is a detailed description of some of embodiments depicted in the accompanying drawings. The embodiments are in such detail as to clearly communicate an invention. However, the amount of detail offered is not intended to limit the anticipated variations of embodiments; but on the contrary, the intention is to cover all modifications, equivalents, and alternatives falling within the spirit and scope of the some embodiments as defined by the appended claims. While specific embodiments will be described below with reference to particular circuit or logic configurations, those of skill in the art will realize that some embodiments disclosed may advantageously be implemented with other similar configurations.

Disclosed herein is a graphics processing apparatus with multiple graphics processing cores (GPC)s that can be automatically configured/connected such that they stay synchronized. The apparatus can also include peripheral component interface express (PCIe) switches to interface the GPCs to a host processor. The apparatus can also include a "dedicated" graphics bus and/or control lines to interconnect the GPCs. The dedicated graphics bus can be implemented with two PCIe endpoints on each side of a nontransparent bridge. The endpoints and nontransparent bridge can provide the dedicated bus and can provide a conduit for control signals such that the GPCs can stay synchronized.

In some embodiments, an apparatus is disclosed that has a first and second graphics processing core both connectable to a host processing system. The apparatus can also include a peripheral component interface express (PCIe) compatible switch and a PCIe endpoint coupled to the first graphics processing core where the PCIe endpoint can facilitate a graphics bus between the first and second graphics core processors. The apparatus can also include a nontransparent bridge between the first and second graphics processor cores to isolate bus operations between the first and second graphics processor cores. A PCIe switch can connect each graphics processing unit to a host processor. In some embodiments, a PCIe endpoint can be configured on each side of the nontransparent bridge.

In yet other embodiments, one PCIe endpoint can be configured to communicate with a peripheral component interface switch supporting the second graphics processing core. The PCIe endpoint can assist in conveying control signals to other graphics processing cores. These control signals can include a reset status, a power status, a power supply line/bus to name a few. In another embodiment, a system with multiple graphics processing units is disclosed. The system can include a first and second graphics processing core and a first PCI endpoint coupled to the first graphics processing core and the second graphics processing core.

The PCIe endpoint can control a graphics bus between the first and second graphics processing units and can transfer signals between the first and second graphics processing cores. In some embodiments, a PCIe switch can couple the first graphics processing unit to a host processing unit. In addition, a nontransparent bridge can be coupled to the first PCI endpoint and the second PCI endpoint. The first PCI endpoint can transfer control signals between the first graphics control core and the second graphics control core.

In another embodiment, a method for operating multiple graphical processing cores is disclosed. The method can include detecting a first graphics processing core, detecting a second graphics processing core, connecting the first graphics processing core to the second graphics processing core with a PCI endpoint, and conveying at least one control signal between the first graphics processing core and the second graphics processing core. The method can also include resetting the first graphics processing core and automatically resetting the second graphics processing core via the PCI endpoint. The method can change a power status of the first graphics processing core and change a status of the second graphics processing core via the PCI endpoint that couples the graphics processing cores.

Referring to FIG. 1 a multiple graphics processing core (GPC) system 100 is illustrated. The illustration shows, on first GPC circuit card 130 some components typically found on a GPC card. The system 100 can have a first GPC card 130 and a second GPC card 132 that are interconnected from PCIe endpoint 120 on first GPC card 130 to PCIe switch 110 on second card 132. The cards 130 and 132 could be GPUs built by Intel Corporation. The system 100 can consist of a plurality of GPU cores or complexes illustrated by GPC 102, and GPC 104. The GPCs 102 and 104 can be located on separate circuit cards that are plugged into a back plane or mother board (not shown). Although only two GPC's are shown, many more GPCs could be interconnected to form a multi-GPC system. Each GPC complex 102 and 104 can have dedicated PCIe switch such as switches 108 and 110 to control communications with a host central processing unit (CPU) 122.

On first circuit card 130, PCIe switch 108 can be connected to PCIe point 1 106, which can be connected to non-transparent bridge 114 which can be connected to PCIe second end point 120. The GPCs 102 and 104 can be attached to CPU 122 via the PCIe switches 108, and 110. The GPCs 102 and 104 can be considered endpoints as they are components that originate, process, and receive data and instructions. A comparable solution can be offered using standard legacy PCI components to connect the multiple GPCs 102 and 104.

The disclosed system can maintain a host-centric architecture. However, the non-transparent bridge 114 allows for a multi-host environment. In some embodiments, the non-transparent bridge 114 has a PCIe endpoint 106 on one side and a PCIe endpoint 120 on the other side where PCIe endpoint 106 can have an independent address domain and PCIe endpoint 120 can have an independent address domain. The PCIe endpoints 106 and 120 can have access or visibility of the complete memory or I/O space on the opposite side of the nontransparent bridge 114. The non-transparent bridge 114 can create a back bus where the host CPU 122 can't detect the activity of the nontransparent bridge 114. The nontransparent bridge 114 may not allow an auto detection process of the host CPU 122 system to accurately see all connected GPCs through the non-transparent bridge 114, since the host CPU 122 can't detect activities of the non-transparent bridge 114 (hence the name nontransparent bridge where activities of a nontransparent bridge are not detectable by a host.). In some embodiments, the host CPU 122 can detect the both GPCs 102 and 104 exclusively the PCIe switches 108 and 110.

Bus 126 can be a data bus that can interconnect the GPCs 102 and 104. In some embodiments, since bus 126 is not directly connected to the CPU 122, CPU 122 cannot read the data being transferred by the nontransparent bridge 114. However, data over the busses can be detectable by the host CPU 122 via switch 110 as an endpoint. In addition, CPU 122 may not be able to detect some of the operating parameters of the GPCs 102 and 104. The GPCs 102 and 104 can share a video processing work load and such workload sharing can be done transparently on a "backside" bus inside the nontransparent bridge 114. Utilizing a dedicated bus inside the non-transparent bridge 114, or a graphics exclusive bus which is not useable and thus transparent to other parts of the system (such as the CPU 122) allows for faster data processing and rendering of video because of less congestion. Such a configuration can also significantly reduce the data transfer load of the CPU 122.

In some embodiments, PCIe express switches 108 and 110 can connect multiple GPCs to the CPU 122 but are not allowed to be directly connected to each other. GPC 102 can be connected to GPC 104 via PCIe endpoint 106, nontransparent bridge 114, PCIe endpoint 120 and switch 110. PCIe endpoint 106 can communicate with non-transparent bridge 114 which can "hide" PCIe endpoint 120 from being detected by PCIe switch 108. PCIe endpoint 120 can connect to the PCIe switch 110 of second circuit card 132 and to second GPC 104. The system can, via the non-transparent bridge 114 conduct back channel communications with other GPCs. The link between PCIe endpoint 120 and the PCIe switch 110 can function as a traditional PCIe link or channel. In some embodiments traditional PCI components not express components could be utilized.

The disclosed arrangements can utilize a traditional PCIe switching configuration component to provide communication between the two GPCs 102 and 104. As stated above, although only two GPCs are illustrated many more GPCs could be connected, as illustrated to share a graphics processing load. As stated above, this architecture however, creates a "dependency" or operating reliance between the GPCs 102 and 104, and the card 130 and 132, that is not visible to the CPU 122 or host operating system. Thus, the host CPU 122 may not be able to detect that multiple GPC's are connected, powered, in an active state, properly operating and providing graphics processing for the system.

This lack of detection of the status of individual GPCs by the CPU 122 can lead to system failures. Accordingly, failures can occur due to the lack of uniform monitoring and control over the multiple GPCs. For example, a GPC might be shut down, reset, or placed in a low power mode when it is supposed to be sharing a processing task. Such a reset or other control could come from the CPU 122. Generally, sharing of the processing load requires communication between the GPCs 102 and 104 such that the GPCs 102 and 104 are synchronized and operate according to at least some of the same (important or critical) control signals. Lack of control consistency between GPCs 102 and 104 due to inadequate monitoring and control inputs to the GPC can create failures in the hardware and/or software of the system.

Many back bus systems can allow circuit cards to be added and removed while the system is running. Such systems can operate similar to a plug and play configuration. Thus, second circuit card 132 can be added to the system and CPU 122 may not be able to sense that GPC 104 even exists. In such a configuration CPU 122 can start changing states of GPC 102 or control GPC 102 differently than GPC 104. For example, if CPU 122 resets GPC 102 and does not reset GPC 104, then there can be discontinuity in processing and in operation generally as GPC 104 will continue processing and can end up in an unknown state. Because of the topology and physical placement, PCIe endpoint 120 may get reset when circuit card 130 is reset and may not get reset when circuit card 132 is reset. The bus 126 and control line 124 allow for the bridging of control signals between the cards 130 and 132, thereby ensuring that at least some specific operations of the cards 130 and 132 will be controlled in a similar manner. For example the cards 130 and 132 can exchange control signals regarding power, power control and reset signals.

In some embodiments, in addition to the traditional PCIe bus connection between GPCs, a reset line 136 (PERST#_B) can connect PCIe endpoint 120 of GPC card 130 to the PCIe switch 110 on GPC card 132. Thus generally, a reset line PERST#_X can be placed between a PCIe endpoint and upstream PCIe switch or port 134. Second PCIe endpoint 120 can utilize this reset line to reset an upstream GPC card (such as second card 132) thereby keeping the GPC 102 synchronized with, or in the same state as GPC 104. This configuration can ensure that the switches will not see an unexpected reset or a "hot removal" of power.

In some embodiments, the CPU 122 can change the power state of the GPCs. For example, a GPC card may run at max speed/max power, or various power savings settings. Such control can depend on system parameters such as how hot the system is, how low a battery is or how long a user wants a battery to last. It can be appreciated that when different GPCs are configured in different states one GPC can process faster than another GPC and system failures can result. This inconsistency in power states and processor and bus speeds between GPCs that are trying to cooperate and share a processing load can create failures in both the hardware and the software. Currently the PCIe specification does not specify controlling different power levels however, in the future it may be possible as with other systems.

Thus, GPCs that are interconnected and sharing a processing task can have control lines and buses such as 124, 126 and 136 to keep the system synchronized. Such synchronization can include not allowing CPU 122 or a host operating system to create different power states of the two GPCs 102 and 104, or allow control of one the GPC's independent of another GPC. In some embodiments CPU 122 can still power down/reset card 130 but the endpoint 120 can remain operational due to the arrangement of the control signals and the power interconnection (endpoint 120 can be connected to a different power bus).

Another problematic situation arises when CPU 122, under the control of the operating system, powers down a GPC such as a GPC 102. In PCIe terminology this is referred to as a "D3cold" command which is a request for a power off state. In this case an interconnected, co-dependent, or piggy backed circuit cards or GPCs will suddenly see a device or an endpoint such as 120 "disappear." A similar issue arises when power is re-applied to a GPC and the GPC will suddenly appear. In this case, a GPC may not see another GPC or device "appear" or "disappear." Thus, a downstream added GPC will not be configured and accepted by the system 100 or a nonfunctioning GPC may be sent a processing task. In both of these situations the system will not be running as desired.

In some embodiments, the mother board or back plane that the GPC cards 130 and 132 can plug into can have distinct self contained power buses. Thus, if one power supply that is connected to a first power domain malfunctions, components connected to another power domain can remain functioning, thus enhancing system reliability. Accordingly, circuit card 130 may be connected to a first power domain and circuit card 132 may be connected to a separate power domain. The first power domain can power card 130 and PCIe endpoint 120, and the second power domain can power circuit card 132. In the event that the second power domain fails, endpoint 120 can transfer power to or supply power to second card 132 or at least send a power status signal.

Thus, second circuit card 132 may not be affected (except possibly during a transfer of power) by a "surprise" removal of power. In some embodiments, circuit card 132 can sense the power from endpoint 120 and when circuit card 130 is removed circuit card 132 can sense such a removal and can also sense a "surprise" re-appearance. Accordingly, power can be passed between cards 130 and 132 or from GPC 102 to GPC 104 or from one device to the other via a side-band connector. Such a configuration can resolve device power state issues.

The disclosed configuration can be utilized when multiple GPCs can be hot plugged or connected and disconnected while the system is operating. Such a feature allows that multiple GPC configuration to be compliant with PCI system specifications, the operating system and advanced configuration and power interface (ACPI) system specifications. The ACPI specification is an industry-developed standard that specifies how the operating system manages the power and operations of the various devices in a personal computer.

It can be appreciated that the disclosed arrangements provides a complete architecture for connecting multiple GPCs in the system using standard PCIe subsystem component, such as a PCIe compatible switch. The disclosed arrangements can utilize standard PCIe components to create a multi-GPC system and such a configuration provides a low cost and robust multiple GPC configuration.

Figure 2:
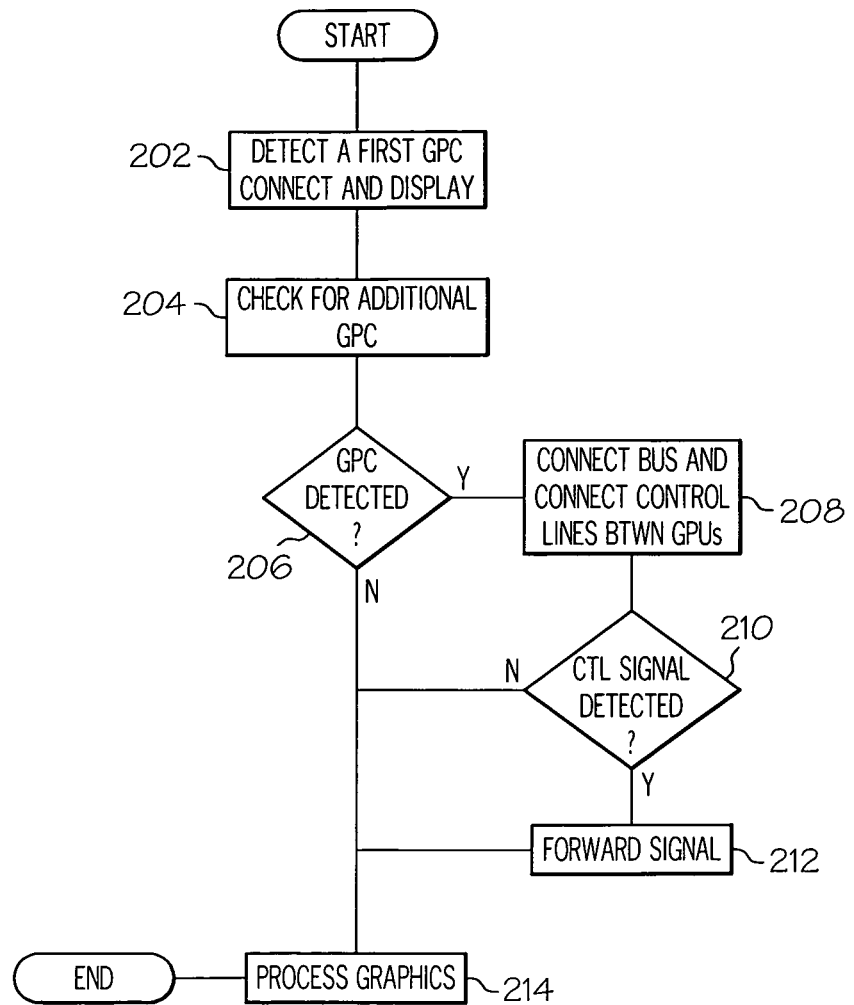
FIG. 2 is a flow diagram for operating a multi-graphics processing system.

Referring to FIG. 2 a flow diagram of a method of configuring and operating a graphics processing system with multiple processing cores (GPC)s is illustrated. As illustrated by block 202, a first graphics processing core can be detected. As illustrated by block 204, the system can continually check for the presence of additional GPCs or for the removal of a GPC. A user may plug in an additional core to increase the video performance of the system. As illustrated by decision block 206, it can be determined if an additional GPC is detected. If no additional GPC is detected, then the system can process graphical information as illustrated by block 214 and the process can end thereafter.

If, as illustrated by decision block 206, an additional GPC is detected then as illustrated by block 208 the newly detected GPC can automatically be connected to an existing GPC with PCIe endpoints and a nontransparent bridge. If a GPC is removed, this can also be detected and the connections can be dissolved. In addition, and as also illustrated by block 208, control signals can be automatically connected between the existing GPC and a discovered GPC. As illustrated by block 210, it can be determined if a control signal is detected, and if no control signal is detected, the system can continue processing graphics. If a control signal is detected then, as illustrated by block 212, the control signal can be forwarded to the newly added GPC and possibly to all GPCs in the system. The system can share the graphics processing workload and process graphics as illustrated by block 214 and the process can end thereafter. Although hot plugging is not typically utilized in a PCIe graphics card expansion process, it is often available for non-graphics card expansions in PCIe systems and for graphics card expansions in non-PCIe systems and the disclosed system can accommodate hot plugging.

As one of ordinary skill in the art will readily appreciate from the teachings herein processes, machines, manufacture, compositions of matter, or methods presently existing or later to be developed that perform substantially the same function or achieve substantially the same result as the corresponding embodiments described herein may be utilized according to some embodiments of the invention. Accordingly, the appended claims are intended to include within their scope such processes, machines, manufacture, compositions of matter or methods.

What is claimed is:

1. An apparatus comprising:
    a first graphics processing core powered via a first power plane;
    a peripheral component interface switch coupled to the first graphics processing core to interface the first graphics processing core with a host via a peripheral component interface bus;
    a first peripheral component interface endpoint coupled to the first graphics processing core; and
    a second peripheral component interface endpoint coupled with the first peripheral component interface endpoint, the second peripheral component interface endpoint having an output to couple to a second graphics processing core powered via a second power plane, wherein a power interconnection between the second peripheral component interface endpoint and the second graphics processing core can transfer power of the second power plane to the second peripheral component interface endpoint, the power states of the second graphics processing core and the second peripheral component interface endpoint to be synchronized.

2. The apparatus of claim 1, further comprising a nontransparent bridge coupled between the first peripheral component interface endpoint and the second peripheral component interface endpoint to isolate at least some operations between the peripheral component switch and the peripheral component interface.

3. The apparatus of claim 2, wherein the nontransparent bridge has a first port and a second port and the second peripheral component interface endpoint is coupled to the first port and the first peripheral component interface is coupled to the second port.

4. The apparatus of claim 1, wherein the first peripheral component interface endpoint is configured to communicate with a second peripheral component interface switch supporting the second graphics processing core.

5. The apparatus of claim 1, wherein the first peripheral component interface endpoint comprises a power output to indicate a power status of the apparatus.

6. The apparatus of claim 1, wherein the second peripheral component interface endpoint comprises a power output to supply power to the second graphics processing unit.

7. The apparatus of claim 1, wherein the second peripheral component interface endpoint to provide a reset signal to the second graphics processing unit.

8. The apparatus of claim 1, wherein the first peripheral component interface endpoint and the second peripheral component interface endpoint facilitate a bus connection between the first graphics processing core and the second graphics processing core.

9. The apparatus of claim 8, wherein the bus connection is transparent to the host processing system.

10. The apparatus of claim 1, wherein the second peripheral component interface endpoint comprises a Peripheral Component Interconnect express compatible endpoint.

11. The apparatus of claim 1, wherein the peripheral component interface switch comprises a Peripheral Component Interconnect express compatible switch.

12. A system comprising:
    a first graphics processing core coupled with a processor via a first peripheral component interface switch;
    a second graphics processing core coupled with the processor via a second peripheral component interface switch;
    a first peripheral component interface endpoint coupled to the first graphics processing core; and
    a second peripheral component interface endpoint coupled to the first peripheral component interface endpoint and to the second graphics processing core, the first peripheral component interface endpoint to control a graphics bus between the first and second peripheral component interface endpoints and to transfer signals between the first graphics processing core and the second graphics processing core, wherein the first peripheral component interface endpoint is to receive a card reset signal from the second graphics processing core in response to transmission of the card reset signal from the processor to the second graphics processing core.

13. The system of claim 12, further comprising a nontransparent bridge coupled to the first peripheral component interface endpoint and coupled to the second peripheral component interface endpoint.

14. The system of claim 12, wherein the first peripheral component interface endpoint transfers control signals between the first graphics control core and the second graphics control core via the second peripheral component interface endpoint.

15. A method comprising:
    detecting a first graphics processing core;
    detecting a second graphics processing core;
    connecting the first graphics processing core to the second graphics processing core via a first peripheral component interface endpoint and a second peripheral component interface endpoint; and
    supplying power via a power interconnection between the second peripheral component interface endpoint and a power plane of the second graphics processing core, wherein power states of the second peripheral component interface endpoint and the second graphics processing core are synchronized.

16. The method of claim 15, further comprising resetting the first graphics processing core automatically in response to resetting the second graphics processing core.

17. The method of claim 15, further comprising changing a power status of the first graphics processing core automatically in response to changing a status of the second graphics processing core with at least one control signal.

18. The method of claim 15, further comprising communicating via a nontransparent bridge between the first graphics processing core and the second graphics processing core.

19. The method of claim 15, further comprising communicating between a host processor and the first and second graphics cores via peripheral component interface switches.

* * * * *